(12) United States Patent
Deixler (10) Patent No.: US 9,192,025 B2
(45) Date of Patent: Nov. 17, 2015

(54) SYSTEMS AND APPARATUS FOR CONTROLLING LIGHTING BASED ON COMBINATION OF INPUTS

(71) Applicant: KONINKLIJKE PHILIPS N.V., Eindhoven (NL)

(72) Inventor: Peter Deixler, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/331,252

(22) Filed: Jul. 15, 2014

(65) Prior Publication Data

US 2015/0022091 A1 Jan. 22, 2015

Related U.S. Application Data

(60) Provisional application No. 61/856,170, filed on Jul. 19, 2013.

(51) Int. Cl.
*H05B 33/08* (2006.01)
*H05B 37/02* (2006.01)

(52) U.S. Cl.
CPC ........ *H05B 37/0218* (2013.01); *H05B 33/0845* (2013.01); *H05B 37/0209* (2013.01); *H05B 37/0227* (2013.01)

(58) Field of Classification Search
None
See application file for complete search history.

(56) References Cited

U.S. PATENT DOCUMENTS

| 7,924,174 B1 | 4/2011 | Gananathan |
| 8,412,354 B2 | 4/2013 | Deixler et al. |
| 2006/0273741 A1* | 12/2006 | Stalker, III ............. 315/291 |
| 2007/0273307 A1 | 11/2007 | Lydecker et al. |
| 2009/0284169 A1* | 11/2009 | Valois .................. 315/291 |
| 2009/0299527 A1 | 12/2009 | Do et al. |
| 2010/0262297 A1 | 10/2010 | Davis et al. |
| 2010/0289412 A1 | 11/2010 | Middleton-White et al. |
| 2010/0295474 A1 | 11/2010 | Chemel et al. |
| 2010/0327766 A1* | 12/2010 | Recker et al. ........... 315/291 |
| 2011/0031897 A1 | 2/2011 | Henig et al. |
| 2011/0133655 A1* | 6/2011 | Recker et al. ........... 315/159 |
| 2011/0178650 A1 | 7/2011 | Picco |
| 2011/0187271 A1 | 8/2011 | Bouws et al. |
| 2012/0206050 A1* | 8/2012 | Spero ................... 315/152 |
| 2012/0262093 A1* | 10/2012 | Recker et al. ........... 315/308 |
| 2013/0141015 A1* | 6/2013 | Van Der Brug et al. ... 315/297 |
| 2014/0001959 A1* | 1/2014 | Motley et al. ........... 315/149 |

FOREIGN PATENT DOCUMENTS

| WO | 2010079388 A1 | 7/2010 |
| WO | 2010085543 A2 | 7/2010 |
| WO | 2011039688 A1 | 4/2011 |

\* cited by examiner

*Primary Examiner* — Crystal L Hammond
(74) *Attorney, Agent, or Firm* — Meenakshy Chakravorty (57) ABSTRACT

Disclosed are lighting fixtures and lighting systems for controlling lighting based on a combination of inputs. The lighting fixtures may comprise a light source, inputs electrically connectable to sensors for sensing daylight, occupancy and environmental conditions, inputs electrically connectable to a group lighting controller output, a memory, and a lighting controller for controlling the dimming state of light sources based on received inputs. The lighting systems may comprise lighting fixtures with dimmable light sources and controllers in electrical communication with the light sources. The controllers may determine dimming states of the light sources based on group inputs and local inputs indicative of light levels, occupancy statuses, and environmental conditions near the lighting fixtures.

21 Claims, 3 Drawing Sheets

SYSTEMS AND APPARATUS FOR CONTROLLING LIGHTING BASED ON COMBINATION OF INPUTS

TECHNICAL FIELD

The present invention is directed generally to lighting control. More particularly, various inventive methods and apparatus disclosed herein relate to controlling one or more properties of light output of a lighting fixture based on local input (based on local sensor readings) and group input (provided to the lighting fixture and additional lighting fixtures) and/or auto-calibration of one or more sensors.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications.

In lighting systems, such as those that include LED-based light sources, it is desirable to have control over one or more light sources of the lighting system. For example, it may be desirable to have control of which of a plurality of light sources are illuminated and/or to have control of one or more lighting parameters of one or more of the light sources. For example, it may be desirable to control the dimming state of light output provided by one or more LED-based lighting fixtures. Control of the dimming state of a lighting fixture may enable energy savings by preventing over-lighting of an area illuminated by the lighting fixture during certain time periods. For example, control of the dimming state of a lighting fixture may enable dimming of the lighting fixture to a low light output level or a no light output level during time periods when users are not present near the lighting fixture. Also, for example, control of the dimming state of a lighting fixture may additionally and/or alternatively enable dimming of the lighting fixture to a lower light output level when natural daylight (alone or in combination with the light output provided by the lighting fixture) is sufficient to illuminate the area illuminated by the lighting fixture to a desired level. Control of the dimming state of a lighting fixture may additionally and/or alternatively enable a high level of light output to be provided by the lighting fixture during certain time periods, such as during emergencies and/or during cleaning.

Some lighting systems utilize a group lighting controller to control the dimming state of a plurality of lighting fixtures controlled by the group lighting controller. For example, the group lighting controller may receive input from a group daylight sensor and control the dimming state of all lighting fixtures controlled by the group lighting controller based on the received input. For example, in response to input from the group daylight sensor indicating an over-lighting condition, the group lighting controller may provide a control command to all controlled lighting fixtures to cause the light output level of all controlled lighting fixtures to be decreased based on the control command. Also, for example, in response to input from the group daylight sensor indicating an under-lighting condition, the group lighting controller may provide a control command to all controlled lighting fixtures to cause the light output level of all controlled lighting fixtures to be increased based on the control command.

However, such group control of a group of lighting fixtures provides the same control signals to all controlled lighting fixtures, thereby resulting in increases and/or decreases of the light output level of all controlled lighting fixtures in accordance with the control signals. Controls utilizing the mains wiring are popular for office renovation. However, the grouping of the lighting fixtures is inherently pre-determined by the already existing mains wiring of the lighting fixtures in the ceiling. Accordingly, in response to an under-lighting condition indicated by a group daylight sensor, a first lighting fixture located immediately adjacent a window and a second lighting fixture in a window-less corner of the room may both receive the same control command that dictates an increase in light output levels. However, it may be the case that an increase in a light output level at the first lighting fixture in accordance with the group control signals would result in an over-lighting condition at an area illuminated by the first lighting fixture. For example, the daylight contribution via the window immediately adjacent the first lighting fixture may be sufficient to achieve a desired lighting level at the area illuminated by the first lighting fixture, and increasing the light output level of the lighting fixture would actually create an over-lighting condition. It is known that over-lighting is undesirable, as the lux level of the lighting deviates from the optimal level required for specific tasks by the end-user. For instance, it is known that an optimal level for computer aided drafting work may require a lower light level than an optimal level for work that mainly involves reading paper (not on a computer). In addition, over-lighting may result in undesired energy waste. Likewise, it may be the case that an increase in a light output level at the second lighting fixture in accordance with the group control signals would result in an under-lighting condition at an area illuminated by the second lighting fixture. For example, the group daylight sensor may be located in an area that receives more daylight than the second lighting fixture and the increase in light output level at the second lighting fixture based on the control commands may be insufficient to remedy the under-lighting condition at the area illuminated by the second lighting fixture. Individual calibration of lighting fixtures to fine-tune response to received control commands may assist in minimizing such issues. However, individual calibration is cumbersome and prone to user error. Moreover, such lighting systems lack the ability to enable a lighting controller of an individual lighting fixture to receive both individual sensor input and group control input and autonomously determine an appropriate dimming state based on such multiple inputs. Additional and/or alternative drawbacks of such lighting systems may be presented.

Thus, there is a need in the art to provide methods and apparatus that enable control of one or more properties of light output of a lighting fixture based on local input (based on local sensor readings) and group input (provided to the lighting fixture and additional lighting fixtures).

SUMMARY

The present disclosure is directed to lighting control. More particularly, various inventive methods and apparatus disclosed herein relate to controlling one or more properties of light output of a lighting fixture based on local input (based on local sensor readings) and group input (provided to the lighting fixture and additional lighting fixtures) and/or auto-calibration of sensors. For example, in some embodiments a lighting controller of a lighting fixture may receive both the local input and the group input and control a dimming level of a light source of the lighting fixture based on comparison of the local input and the group input. For example, the local input may be based on input from a local sensor that is indicative of a light level near the lighting fixture and the group input may be indicative of a desired group level of dimming. If the local input indicates that a second level of dimming may be implemented at the lighting fixture that is more aggressive than the group level of dimming, while achieving a desired light level near the lighting fixture, then the second level of dimming may be implemented.

Various embodiments of the disclosure include a lighting fixture with a local sensor. In some embodiments the local sensor may be a daylight sensor and/or an occupancy sensor. In some embodiments the local sensor may be an environmental sensor such as an acoustic sensor, an electronic nose/smell sensor, a smoke sensor, and/or a $CO_2$ sensor. In some embodiments the local sensor may be an apparatus that provides installation context information to a controller of a lighting fixture. For example, the installation context information may provide an indication of the prevalent task performed in an area illuminated by the lighting fixture such as computer aided drafting work, reading paper documents, and/or reading by elderly workers (which may require a higher light output due to weaker eyes). The installation context information may be preprogrammed or preconfigured in the local sensor and/or may be received via one or more network interfaces. For example, in some embodiments the local sensor may include a network interface (e.g., Bluetooth, Wi-Fi) to enable personalized control of installation context information via one or more computing devices such as a mobile computing device (e.g., smart phone, tablet) utilizing, for example, a local control user interface such as a local control user interface described herein.

Generally, in one aspect, a lighting system is provided and includes a group lighting controller controlling a dimming state of a group of lighting fixtures via a group lighting controller output provided to the group of lighting fixtures. The group of lighting fixtures includes a first lighting fixture and a second lighting fixture. The first lighting fixture includes: a first light source; a first lighting controller; and one of a first daylight sensor providing first sensor values indicative of light levels near the first lighting fixture, a first occupancy sensor providing first sensor values indicative of occupancy status near the first lighting fixture, and a first environmental sensor providing first sensor values indicative of environmental conditions near the first lighting fixture. The first lighting controller controls the dimming state of the first light source by receiving a first local input indicative of the first sensor values and a first group input indicative of the group lighting controller output. The first lighting controller determines the dimming state of the first light source based on the first group input and the first local input. The second lighting fixture includes a second light source; a second lighting controller; and one of a second daylight sensor providing second sensor values indicative of light levels near the second lighting fixture, a second occupancy sensor providing second sensor values indicative of occupancy status near the second lighting fixture, and a second environmental sensor providing second sensor values indicative of environmental conditions near the second lighting fixture. The second lighting controller controls the dimming state of the second light source by receiving a second local input indicative of the second sensor values and a second group input indicative of the group lighting controller output. The second lighting controller determines the dimming state of the second light source based on the second group input and the second local input.

In some embodiments, the group lighting controller controls the dimming state of the group of lighting fixtures via phase cutting of the group lighting controller output.

In some embodiments, the group lighting controller receives group sensor input from one of a group daylight sensor, group occupancy sensor, and environmental sensor. The group lighting controller controls the dimming state of the group of lighting fixtures via the group lighting control output based on the group sensor input. In some versions of those embodiments, the one of the group daylight sensor, the group occupancy sensor, and the environmental sensor is directly electrically coupled to the group lighting controller. In some versions of those embodiments, the group lighting controller controls the dimming state of the group of lighting fixtures via phase cutting of the group lighting controller output. In some versions of those embodiments, the group lighting controller output includes power line communication and the group lighting controller controls the power line communication. In some of those versions, the power line communication utilizes a digital load line transmission protocol. In some of those versions, the group lighting controller output is provided over at least one line of an output voltage provided to the first lighting fixture and the second lighting fixture and the group lighting controller output is generated via the group lighting controller causing switching of a transformer in series with the at least one line of the output voltage during a plurality of cycle periods of the output voltage that causes one of a voltage drop and a voltage rise in the output voltage to encode a data packet in the output voltage. In some versions of those embodiments, the group lighting controller controls the dimming state of the group of lighting fixtures via group commands that include symbol tags and are sent via the group lighting controller output. In some of those versions, the first lighting controller and the second lighting controller each include a symbol tag interpreter that receives and interprets the symbol tags.

In some embodiments, the group lighting controller includes an occupancy sensor, the first lighting fixture includes the first daylight sensor, and the second lighting fixture includes the second daylight sensor.

In some embodiments, the group lighting controller includes a daylight sensor, the first lighting fixture includes the first occupancy sensor, and the second lighting fixture includes the second occupancy sensor.

In some embodiments, the first local input consists of the first sensor values.

In some embodiments, the first lighting controller controls the dimming state of the first light source based on the first local input when the first local input is indicative of a dimming level that produces less light from the light source than the dimming level indicated by the first group input.

In some embodiments, the first lighting controller controls the dimming state of the first light source based on the first local input when the first local input is indicative of a dimming level that produces more light from the light source than the dimming level indicated by the first group input.

In some embodiments, the system further includes: a third lighting fixture of the group of lighting fixtures. The third lighting fixture includes: a third light source, and a third lighting controller controlling the dimming state of the third light source based on a third group input indicative of the group lighting controller output. The controlling is independent of any local sensor.

In some embodiments, the system further includes a third lighting fixture of the group of lighting fixtures. The third lighting fixture includes a third light source, a third local sensor providing local sensor values, and a third lighting controller controlling the dimming state of the third light source based on a third local input indicative of the third local sensor values. The controlling is independent of the group lighting controller output. In some versions of those embodiments, the third lighting fixture is a lighting fixture installed in one of a corridor and an emergency exit.

In some embodiments, the first lighting fixture includes the first daylight sensor and is operable in an auto-calibration state. During the auto-calibration state the lighting controller maintains the dimming state of the first light source at an auto-calibration level, and determines a desired light level near the first lighting fixture. The desired light level is utilized in the determination of the dimming state of the first light source. In some versions of those embodiments, during the auto-calibration state, the lighting controller determines a minimum first local input value from the first local input over a time period, and determines the desired light level based on the minimum first local input value, where the minimum first local input value is indicative of a minimum light level indicated by the first sensor values. In some of those versions, the time period is at least twelve hours. In some versions of those embodiments, during the auto-calibration state, the lighting controller determines a first local input value from the first local input at one or more times likely to have no natural light and determines the desired light level based on the first local input value. In some versions of those embodiments, the auto-calibration level is a full light output level.

In some embodiments, the group lighting controller output is provided over mains wiring supplying power to the first lighting fixture and the second lighting fixture.

In some embodiments, the group lighting controller output is provided over DC wiring supplying power to the first lighting fixture and the second lighting fixture.

Generally, in another aspect, a lighting fixture is provided and includes: a light source; a first input electrically connectable to one of a daylight sensor providing sensor values indicative of light levels near the lighting fixture, an occupancy sensor providing sensor values indicative of occupancy status near the lighting fixture, and an environmental sensor providing sensor values indicative of environmental conditions near the lighting fixture; a second input electrically connectable to a group lighting controller output; a memory; a lighting controller controlling the dimming state of the light source, where the lighting controller is operable to execute instructions, stored in the memory, including instructions to perform the operations of: receiving local input via the first input, the local input indicative of the sensor values; receiving group input via the second input, the group input indicative of the group lighting controller output, wherein the group lighting controller output utilizes phase cutting to indicate a dimming level to control the dimming state of the lighting fixture and at least one additional lighting fixture; and determining the dimming state of the light source based on the group input and the local input.

In some embodiments, the lighting fixture includes the daylight sensor and wherein the group lighting controller output is responsive to a group occupancy sensor.

In some embodiments, the lighting fixture includes the occupancy sensor and wherein the group lighting controller output is responsive to a group daylight sensor.

In some embodiments, the local input consists of the sensor values.

In some embodiments, the memory includes an expected lux level for the lighting fixture. In some versions of those embodiments, the lighting controller utilizes the expected lux level in auto-calibration of the lighting fixture. In some versions of those embodiments, the expected lux level is adjustable via late stage configuration of the lighting controller.

In some embodiments, the lighting controller controls the dimming state of the light source based on the local input when the local input is indicative of a dimming level that produces less light from the light source than the dimming level indicated by the group input.

In some embodiments, the lighting controller controls the dimming state of the light source based on the local input when the local input is indicative of a dimming level that produces more light from the light source than the dimming level indicated by the group input. In some versions of those embodiments, the lighting fixture is an architectural lighting fixture.

In some embodiments, the lighting fixture includes the daylight sensor and is operable in an auto-calibration state, during the auto-calibration state the lighting controller maintaining the dimming state of the light source at an auto-calibration level and determining a desired light level near the lighting fixture, the desired light level utilized in the determination of the dimming state of the lighting fixture. In some versions of those embodiments, during the auto-calibration state, the lighting controller determines a minimum local input value from the local input over a time period and determines the desired light level based on the minimum local input value, the minimum local input value indicative of a minimum light level indicated by the sensor values. In some of those versions, the time period is at least twelve hours. In some of those versions, the time period is at least twenty-four hours. In some versions of those embodiments, during the auto-calibration state, the lighting controller determines a first local input value from the local input at one or more times likely to have no natural light and determines the desired light level based on the first local input value. In some versions of those embodiments, the auto-calibration level is a full light output level. In some versions of those embodiments, the auto-calibration level is a reduced light output level. In some of those versions, the lighting controller determines the reduced light output level and provides the reduced light output level to the daylight sensor. In some of those versions, the lighting sensor autonomously determines the reduced light output level.

In some embodiments, the group input is provided over mains wiring supplying power to the lighting fixture.

Generally, in another aspect, a method of adjusting lighting at a lighting fixture based on a local input and a global input is provided and includes the steps of: receiving local input indicative of one of light levels near a lighting fixture, occupancy status near the lighting fixture, and environmental conditions near the lighting fixture; receiving group input, the group input utilizing manipulation of mains power powering the lighting fixture to indicate a dimming level to control the dimming state of the lighting fixture and at least one additional lighting fixture; and determining the dimming state of a light source of the lighting fixture based on the group input and the local input.

In some embodiments, the local input is indicative of light levels near the lighting fixture and wherein the group input is responsive to a group occupancy sensor.

In some embodiments, the local input is indicative of occupancy status near the lighting fixture and wherein the group input is responsive to a group daylight sensor.

In some embodiments, the local input consists of sensor values received from at least one of a daylight sensor and an occupancy sensor.

In some embodiments, the dimming state of the light source is controlled based on the local input when the local input is indicative of a dimming level that produces less light from the light source than the dimming level indicated by the group input.

In some embodiments, the dimming state of the light source is controlled based on the local input when the local input is indicative of a dimming level that produces more light from the light source than the dimming level indicated by the group input.

In some embodiments, the local input is indicative of light levels near the lighting fixture and the method further includes, during an auto-calibration state, the step of maintaining the dimming state of the light source at an auto-calibration level and determining a desired light level near the lighting fixture, the desired light level utilized in the determining the dimming state of the light source. In some versions of those embodiments, the method further includes, during the auto-calibration state, the step of determining a minimum local input value from the local input over a time period; and the step of determining the desired light level based on the minimum first local input value, the minimum first local input value indicative of a minimum light level indicated by the first sensor values. In some of those versions, the time period is at least twelve hours. In some versions of those embodiments, the method further includes during the auto-calibration state, the step of determining a first local input value from the first local input at one or more times likely to have no natural light and the step of determining the desired light level based on the first local input value.

In some versions of those embodiments, the auto-calibration level is a full light output level.

In some embodiments, the manipulation of the mains power includes phase-cutting of the mains power.

Generally, in another aspect, a method of adjusting lighting is provided and includes the steps of: receiving first local input at a first lighting fixture, the first local input indicative of one of light levels near the first lighting fixture, occupancy status near the first lighting fixture, and environmental conditions near the first lighting fixture; receiving group input at the first lighting fixture, the group input indicating a dimming level to control the dimming state of the first lighting fixture and the dimming state of the second lighting fixture; determining the dimming state of a first light source of the first lighting fixture based on the group input and the first local input; receiving second local input at a second lighting fixture, the second local input indicative of one of light levels near the second lighting fixture, occupancy status near the second lighting fixture, and environmental conditions near the second lighting fixture; receiving the group input at the second lighting fixture; and determining the dimming state of a second light source of the second lighting fixture based on the group input and the second local input.

In some embodiments, the method further includes: determining, at a first time, that the first local input is indicative of a dimming level that produces less light from the first light source than the dimming level indicated by the group input; and controlling the dimming state of the first light source based on the first local input. In some versions of those embodiments, the method further includes: determining, at the first time, the second local input is indicative of a dimming level that produces more light from the second light source than the dimming level indicated by the group input, and controlling the dimming state of the second light source based on the group input. In some versions of those embodiments, the method further includes: determining, at the first time, the second local input is indicative of a dimming level that produces less light from the second light source than the dimming level indicated by the group input; and controlling the dimming state of the second light source based on the second local input. In some of those versions, the dimming state of the first light source based on the first local input is unique from the dimming state of the second light source based on the second local input.

Generally, in another aspect, a lighting system is provided and includes: a first lighting fixture having a dimmable first light source; a first controller in electrical communication with the first light source, wherein the first controller: receives first local input, the first local input indicative of one of light levels near the first lighting fixture, occupancy status near the first lighting fixture, and environmental conditions near the first lighting fixture, receives group input indicating a dimming level, and determines the dimming state of a first light source of the first lighting fixture based on the group input and the first local input; a second lighting fixture having a dimmable second light source; and a second controller in electrical communication with the second light source, wherein the second controller: receives second local input, the second local input indicative of one of light levels near the second lighting fixture, occupancy status near the second lighting fixture, and environmental conditions near the second lighting fixture, receives the group input at the second lighting fixture, and determines the dimming state of a second light source of the second lighting fixture based on the group input and the second local input.

Other embodiments may include a non-transitory computer readable storage medium storing instructions executable by a processor to perform a method such as one or more of the methods described herein. Yet other embodiments may include a system including memory and one or more processors operable to execute instructions, stored in the memory, to perform a method such as one or more of the methods described herein.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above). A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In lighting systems, it is desirable to have control over one or more lighting fixtures of the lighting system. For example, it may be desirable to have control of which of a plurality of lighting fixtures are illuminated and/or to have control of one or more lighting parameters of one or more of the lighting fixtures. For example, it may be desirable to control the dimming state of light output provided by one or more LED-based lighting fixtures. Control of the dimming state of a lighting fixture may enable energy savings by preventing over-lighting of an area illuminated by the lighting fixture during certain time periods. Control of the dimming state of the lighting fixture may also be desirable for tuning the light output level of a lighting fixture to the task performed in the area illuminated by the lighting fixture. For example, a row of desks for computer aided drafting work may require a lower light level than an adjacent row of desks mostly user for reading paper documents.

Some lighting systems utilize a group lighting controller to control the dimming state of a plurality of lighting fixtures controlled by the group lighting controller. Such group control presents one or more drawbacks such as over-lighting and/or under-lighting by one or more lighting fixtures. Individual calibration of lighting fixtures may assist in minimizing such issues, but is cumbersome and prone to user error. Moreover, a single lighting fixture cannot control its dimming state based on both group input and local input. Additional and/or alternative drawbacks of such lighting systems may be presented. For example, in some lighting systems it is not possible to create lighting fixture "islands", each with different response curves for daylight harvesting. For example, it is not possible to have one row of desks with an optimized daylight harvesting response curve for computer aided drafting work and another row of desks with an optimized daylight harvesting response curve for reading or elderly workers. Also, for example, it may not be possible to have functional general lighting fixtures and architectural lighting fixtures (e.g., accent lighting onto an architectural feature) on the same mains wiring and/or group control since, for general lighting fixtures it may be desirable to reduce the artificial lighting level with increasing daylight, while with the architectural lighting it may be desirable to increase the lighting level with increasing daylight. Also, for example, in some lighting systems it may not be possible to create separate groups of emergency lighting fixtures (e.g., those located adjacent emergency exits), which always remain at full light output and disregard group dimming commands. In addition, the lack of granularity of some lighting systems results in energy waste due to over lighting, as the maximum achievable daylight harvesting level may be determined by the lighting fixture location requiring the weakest dimming response.

Thus, Applicants have recognized and appreciated a need in the art to provide methods and apparatus that enable control of one or more properties of light output of a lighting fixture based on local input and group input and that optionally overcome one or more drawbacks of existing apparatus and/or methods.

In view of the foregoing, various embodiments and implementations of the present invention are directed to lighting control based on a combination of inputs.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a lighting system having only LED-based light sources. However, one or more aspects of the methods and apparatus described herein may be implemented in other lighting systems that additionally and/or alternatively include other non-LED light sources. Implementation of the one or more aspects described herein in alternatively configured environments is contemplated without deviating from the scope or spirit of the claimed invention. Also, for example, aspects of the methods and apparatus disclosed herein are described in conjunction with certain embodiments of a group lighting controller. However, one or more aspects of the methods and apparatus described herein may be implemented in other lighting systems that may include group lighting controllers providing additional and/or alternative functionality beyond that described herein in conjunction with the embodiments of the group lighting controller.

Figure 1:
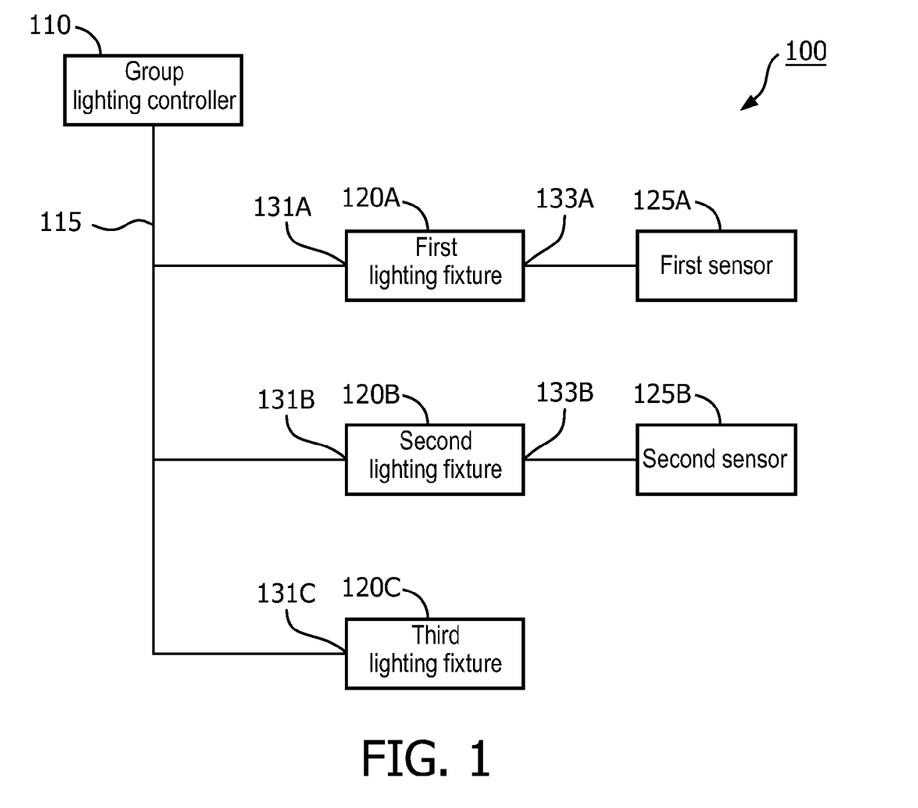
FIG. 1 illustrates a block diagram of an embodiment of a LED-based lighting system having a group lighting controller and three lighting fixtures.

FIG. 1 illustrates a block diagram of an embodiment of a LED-based lighting system 100 having a group lighting controller 110, a first lighting fixture 120A, a second lighting fixture 120B, and a third lighting fixture 120C. In some embodiments the group lighting controller 110 provides a group lighting controller output over wiring 115. The wiring 115 is coupled to the first lighting fixture 120A via a first group connection 131A, coupled to the second lighting fixture 120B via a second group connection 131B, and coupled to the third lighting fixture 120C via a third group connection 131C. The group lighting controller output provided over wiring 115 may at least selectively include group lighting control commands that are provided to all of the lighting fixtures 120A-C. Group lighting control commands are not individually tailored to the individual lighting fixtures 132A-C, but, instead, indicate a single desired lighting control state that each lighting fixture 120A-C may individually process as described herein.

In some embodiments the wiring 115 comprises mains wiring that also supplies power to the lighting fixtures 120A-C. Provided power may include, for example, 120 Volts AC, 277 Volts AC, 230 Volts AC, and/or DC power such as solar power and/or the Emerge distribution standard. In some versions of those embodiments the group lighting control commands may be sent to the lighting fixtures 120A-C via a digital load line uni-directional communication provided via wiring 115 to the lighting fixtures 120A-C. In some other versions of those embodiments the group lighting control commands may be sent via phase-cutting of the power wave form provided via wiring 115 to the lighting fixtures 120A-C. For example, the wiring 115 may include three-wires and the group lighting controller 110 may utilize three-wire analog phase-cut dimming to provide group dimming commands via the wiring 115. Also, for example, the wiring 115 may include two-wires and the group lighting controller 110 may utilize two-wire analog phase-cut dimming to provide group dimming commands via the wiring 115. In some versions of the embodiments that utilize phase-cut dimming, the group lighting controller 110 may receive input, such as input from one or more sensors such as a group occupancy sensor or a group daylight sensor. In some versions of the embodiments that utilize phase-cut dimming, the group lighting controller 110 may receive input from a dimmer user interface such as a wall-mounted dimmer user interface utilizing a dimmer slide, a touch-screen, and/or other user interface element. In some versions of the embodiments that utilize phase-cut dimming, the group lighting controller 110 may include an interface to a building control system. The group lighting controller 110 may provide the same and/or alternative phase-cut dimming to additional mains-wiring switch legs that power additional lighting fixtures beyond lighting fixtures 120A-C depicted herein. In some embodiments one or more of such additional lighting fixtures may additionally receive a local input and adjust lighting at the lighting fixture responsive to the local input and the group input provided via the group lighting controller 110. In some embodiments, the wiring 115 may include two wires and the group lighting controller 110 may utilize two wire Digital Load Line transmission (DLT) control to provide group dimming commands via the wiring 115.

In some embodiments, group lighting controller 110 may utilize a unidirectional communication protocol with low data rates to provide group lighting control commands via wiring 115 that also supplies power to the lighting fixtures 120A-C. For example, one or more aspects of the techniques described in U.S. Patent Application Publication No. 2013/0141015 may be utilized, which may provide group lighting control commands that may optionally be received and/or decoded using standard hardware already available in modern lamps. One possible implementation form for such technology is for street lighting. In the case of street lighting, group lighting control commands may be transmitted from a feeder pillar or street cabinet to a plurality of street lighting fixtures via altering the output voltage transmitted to the street lighting fixtures through switching of a transformer connected to the output voltage. Data may be received at a street lighting fixture via receiving an encoded output voltage and comparing the voltage level of a plurality of sine cycle periods of the output voltage to determine an incoming data packet. A local sensor such as an additional daylight, occupancy, or environmental sensor can be added to each of one or more of the street lighting fixtures and utilized in combination with the group lighting control commands as described herein.

In some embodiments the wiring 115 comprises wiring that is distinct from the mains wiring that supplies power to the lighting fixtures 120A-C. In some versions of those embodiments group lighting controller output may be sent via analog signal dimming over the distinct wiring. In some other versions of those embodiments the group lighting controller output may be sent via digital signal dimming. For example, some embodiments may utilize the Digital Addressable Lighting Interface (DALI) protocol and/or other digital protocol. Some embodiments may include CAT5 or CAT6 low-voltage wiring, wherein the data and power can either share the same strand or use separate strands within the same CAT5 or CAT6 wiring. Embodiments that utilize wiring that is distinct from the mains wiring that supplies power to the lighting fixtures 120A-C may utilize one or more individual wires to provide group lighting controller output to the lighting fixtures 120A-C. In some versions of the embodiments that utilize wiring that is distinct from the mains wiring, the group lighting controller output may at least selectively include group lighting control commands that are directed to all of the lighting fixtures 120A-C. In some versions of the embodiments that utilize wiring that is distinct from the mains wiring, the group lighting controller output may additionally and/or alternatively include individual lighting control commands that are individually addressed to individual of the lighting fixtures 120A-C. In some versions of the embodiments that utilize wiring that is distinct from the mains wiring that supplies power to the lighting fixtures, the group lighting controller 110 may receive input, such as input from one or more sensors such as a group occupancy sensor or a group daylight sensor. In some versions of the embodiments that utilize wiring that is distinct from the mains wiring that supplies power to the lighting fixtures 120A-C, the group lighting controller 110 may receive input from a dimmer user interface such as a wall-mounted dimmer user interface utilizing a dimmer slide, a touch-screen, and/or other user interface element such as a computing device (e.g., a tablet, a smart phone). In some versions of the embodiments that utilize wiring that is distinct from the mains wiring that supplies power to the lighting fixtures 120A-C, the group lighting controller 110 may include a building control system. The group lighting controller 110 may provide the same and/or alternative group lighting controller output to additional lighting fixtures beyond lighting fixtures 120A-C depicted herein. In some embodiments one or more of such additional lighting fixtures may additionally receive a local input and adjust lighting at the lighting fixture responsive to the local input and the group input provided via the group lighting controller 110.

In some embodiments, wiring 115 is omitted and the group lighting control commands are provided wirelessly. For example, in some embodiments the group lighting control commands may be provided to lighting fixtures 120A-C via radio-frequency (RF) communications utilizing one or more protocols such as Zigbee and/or EnOcean. Also, for example, the group lighting control commands may also be sent from a smart phone utilizing Bluetooth, Wi-Fi, and/or other protocol (e.g., an override lighting control command that triggers an emergency mode or a cleaning mode (light full on)). Lighting controllers of the lighting fixtures 120A-C may include or be coupled to wireless communication interfaces to enable receipt of any RF communications. In some versions of the embodiments that utilize wireless communications, the group lighting controller output may at least selectively include group lighting control commands that are directed to all of the lighting fixtures 120A-C. In some versions of the embodiments that utilize wireless communications, the group lighting controller output may additionally and/or alternatively include individual lighting control commands that are individually addressed to individual of the lighting fixtures 120A-C.

As discussed herein, in some embodiments the group lighting controller 110 may be a building control system. Building control systems may utilize one or more automatically determined parameters, user-specified parameters, and/or sensor-based parameters in determining group lighting control commands to send to a group of lighting fixtures, such as lighting fixtures 120A-C. Lighting fixtures controlled by a building control system may include lighting fixtures in just some parts of a building and/or in all parts of a building.

In some embodiments, the group lighting controller 110 may provide lighting control commands based on a scene-setting input. For example, in some embodiments a scene-setting input may be automatically and/or manually received (e.g., via a user interface element) to request lighting fixtures to provide light output in accordance with a desired scene. For example, a first "working-hours" scene-setting input may result in group lighting controller 110 providing lighting control commands to request lighting fixtures 120A-C provide light output at a work output level (e.g., a full output level). Also, for example, a second "non-working hours" scene-setting input may result in group lighting controller 110 providing lighting control commands to request lighting fixtures 120A-C provide light output at a non-work output level (e.g., 50% output level).

In some embodiments, the group lighting controller 110 may provide lighting control commands based on input from one or more sensors. For example, in some embodiments the lighting fixtures 120A-C may all be in a single room and the group lighting controller may be coupled to an occupancy sensor located near the door to the room. If input is received from the occupancy sensor indicating presence of one or more individuals in the room, the group lighting controller 110 may provide lighting control commands to request lighting fixtures 120A-C provide light output at a first output level (e.g., a full output level). If input is received from the occupancy sensor indicating presence of one or more individuals in the room within the last twenty minutes, but no presence of one or more individuals in the room within the last ten minutes, the group lighting controller 110 may provide lighting control commands to request lighting fixtures 120A-C provide light output at a second output level (e.g., a 25% output level). Also, for example, in some embodiments the group lighting controller may be coupled to a daylight sensor located near one or more windows and provide sensor input indicative of sensed light levels. The group lighting controller 110 may provide lighting control commands to request lighting fixtures 120A-C provide light output at a level based on the sensed light levels (e.g., decrease light output if sensed light level exceeds a threshold and increase light output if sensed light level fails to exceed a threshold). In some embodiments the group lighting controller 110 may provide lighting control commands based on load-shedding input (e.g., based on input from a utility company). In some embodiments the group lighting controller 110 may provide lighting control commands based on input from one or more timers. The group lighting controller 110 may utilize additional and/or alternative inputs and/or additional and/or alternative parameters in determining desired group lighting controller output to provide via wiring 115. For example, the group lighting controller 110 may provide group lighting control commands to lighting fixtures 120A-C utilizing symbol tags and the lighting controllers of the lighting fixtures 120A-C may have a symbol tag interpreter as described, for example, in U.S. Pat. No. 8,412,354.

The first lighting fixture 120A is coupled to a first sensor 125A via first local connection 133A and receives first sensor values from the first sensor 125A. In some embodiments the connection between the first sensor 125A and the first local connection 133A is a wired connection. In some embodiments the connection between the first sensor 125A and the first local connection 133A is a wireless connection. In some embodiments where lighting control commands are also provided wirelessly (e.g., a battery-less switch utilizing the EnOcean protocol), the first group connection 131A and the first local connection 133A may be implemented via a single wireless radio. The first sensor 125A is located near the first lighting fixture 120A and positioned so as to provide sensor values that are relevant to the area illuminated by the first lighting fixture 120A. In some embodiments the first sensor 125A may be mounted on the first lighting fixture 120A or integrated with the first lighting fixture 120A.

The second lighting fixture 120B is electrically coupled (wired or wireless) to a second sensor 125B via second local connection 133B and receives second sensor values from the second sensor 125B. The second sensor 125B is located near the second lighting fixture 120B and positioned so as to provide sensor values that are relevant to the area illuminated by the second lighting fixture 120B. In some embodiments the second sensor 125B may be mounted on the second lighting fixture 120B or integrated with the second lighting fixture 120B. The third lighting fixture 120C is not connected to any local sensors.

As discussed herein, the first lighting fixture 120A controls the dimming state of a light source thereof based on the group lighting controller input received via first group connection 131A and input received via the first local connection 133A. Also, the second lighting fixture 120B similarly controls the dimming state of a light source thereof based on the group lighting controller input received via second group connection 131B and input received via second local connection 133B. The third lighting fixture 120C does not include a local connection and controls the dimming state of a light source thereof based on the group lighting controller input, irrespective of local input from a local connection. In some embodiments no sensor may be provided with the third lighting fixture 120C due to an installation location of the third lighting fixture. For example, the first sensors 125A and second sensor 125B may be daylight sensors and may be coupled to the first and second lighting fixtures 120A, 120B due to the first and second lighting fixtures 120A, 120B being installed near a window. However, the third lighting fixture 120C may be located remotely from a window and it may be determined it is unnecessary to couple a lighting sensor to third lighting fixture 120C due to its installation location.

Figure 2:
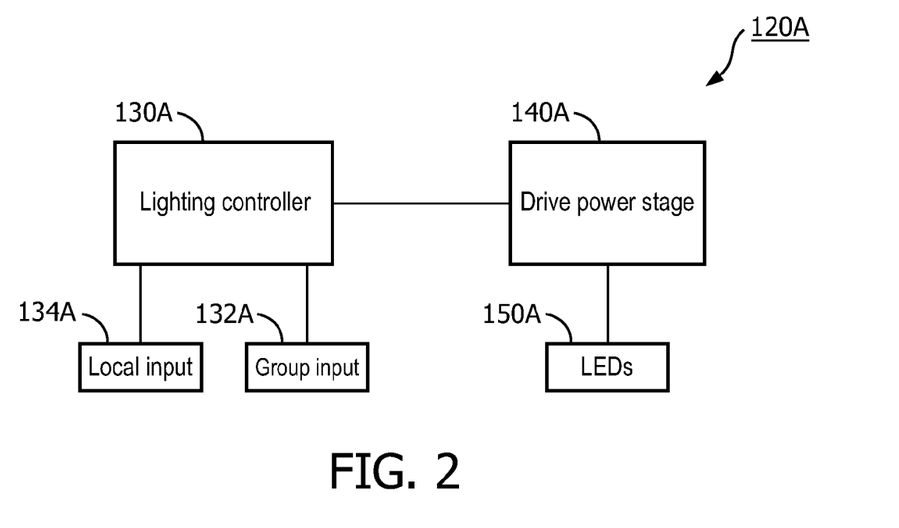
FIG. 2 illustrates a block diagram of one of the lighting fixtures of FIG. 1

With reference to FIG. 2, the first lighting fixture 120A includes a lighting controller 130A. The lighting controller 130A receives local input 134A. Local input 134A is indicative of the first sensor values received from first sensor 125A via first local connection 133A. In some embodiments the local input 134A is the same as the first sensor values. For example, the local connection 133A may be coupled directly to the local input 134A. In some embodiments the first local input 134A may be indicative of the first sensor values, but be input that is processed relative to the first sensor values. For example, the first sensor values received via first lighting connection 133A may be analog signals, the analog signals converted to digital values by an analog to digital converter, and the digital values provided as the first local input 134A.

Group input 132A is indicative of the group lighting controller output provided via the wiring 115 and first group connection 131A. In some embodiments the group input 132A is the same as the group lighting controller output. For example, the first group connection 131A may be coupled directly to the first group input 132A. In some embodiments the first group input 132A may be indicative of the group lighting controller output, but be input that is processed relative to the group lighting controller output. For example, the group lighting controller output received via first group connection 131A may be analog signals, the analog signals converted to digital values by an analog to digital converter, and the digital values provided as the first group input 132A. The lighting controller 130A may be implemented in an analog and/or digital manner. For example, in the case of selecting the lowest value among the first local input 134A and the first group input 132A, an analog implementation of the lighting controller 130A may be utilized.

The lighting controller 130A is coupled to the driver power stage 140A and provides control commands to the driver power stage 140A. The driver power stage 140A powers the LEDs 150A based on the received control commands. For example, the lighting controller 130A may provide control commands to the driver power stage 140A to power the LEDs 150A at 50% light output and the driver power stage 140A may adjust power output provided to the LEDs to achieve 50% light output. For example, the driver power stage 140A may include one or more chopping circuits and utilize the chopping circuits to adjust the output voltage provided to the LEDs to achieve 50% light output. In some embodiments the lighting controller 130A and the driver power stage 140A may be combined and form a driver of the lighting fixture 120A. For example, the lighting controller 130A may be a controller included in the driver of the lighting fixture 120A.

The lighting controller 130A receives the first local input 134A and the first group input 132A, compares the first local input 134A and the first group input 132A, and provides control commands to control the dimming state of the LEDs 150A based on the comparison of the first local input 134A and the first group input 132A. For example, the first group input 132A may indicate that the lighting fixtures 120A-C should provide full light output. The lighting controller 130A may receive the first group input 132A and cause full light output (e.g., 100%) to be provided via the LEDs 150A. The first sensor 125A may be a daylight sensor and the lighting controller 130A may further receive the first local input 134A and adjust the light output provided by the LEDs 150A so that a desired light level is still being achieved in the area illuminated by the lighting fixture, without unnecessarily providing over-lighting. The desired light level is generally indicative of an intended level of light, for a given setting (e.g., full output setting), that should collectively be provided to the area illuminated by the lighting fixture 120A via the LEDs 150A and daylight and/or other light sources. The desired light level may be stored in memory associated with the lighting controller 130A and may optionally be determined utilizing auto-calibration methods such as those described herein. The first local input 134A may be received after providing the full light output via LEDs 150A and the received first local input 134A may indicate that the light level sensed by the daylight sensor is greater than a desired full light level (e.g., due to the presence of daylight). Based on the first local input 134A indicating a light level that is greater than a desired full light level, the light output provided via the LEDs 150A may be downwardly adjusted until the first local input 134A indicates a light level that is approximately equal to the desired full light level.

Also, for example, first local input 134A may be received before providing the full light output via LEDs 150A and the received first local input 134A may indicate a light level sensed by the daylight sensor. Based on the first local input 134A, the light output of the LEDs 150A may be initially adjusted to a light output that is less than full output, but that will collectively with daylight and/or other sources provide a light level that that is approximately equal to the desired full light level. For example, the first local input 134A may indicate a light level that is substantially equal to the desired full light level, and it may be determined that the light output of the LEDs 150A do not need to be adjusted. Thus, the light output of the LEDs 150A may be adjusted to achieve a desired light level, without unnecessarily providing over-lighting. Additional examples of control of the dimming state of the LEDs 150A based on the local input 134A and the group input 132B are provided herein with respect to FIG. 3.

The lighting controller 120A may include and/or access a storage subsystem containing programming and data constructs that provide the functionality of some or all of the modules described herein. For example, the storage subsystem may include the logic to determine lighting property adjustments for one or more LEDs based on data received from a group input and a local input and/or to implement lighting property adjustments in response to the data. Memory may be used in the storage subsystem of lighting controller 120A and may be accessed by lighting controller 120A. Memory can include a number of memories including a main random access memory (RAM) for storage of instructions and data during program execution and a read only memory (ROM) in which fixed instructions are stored. A file storage subsystem can provide persistent storage for program and data files, and may include a hard disk drive, a floppy disk drive along with associated removable media, a CD-ROM drive, an optical drive, or removable media cartridges.

In some embodiments, lighting fixtures 120B and 120C may include similar components as lighting fixture 120A. For example, lighting fixture 120B may include a lighting controller receiving a local input and a group input; a driver power stage; and LEDs. Although three lighting fixtures 120A-C are illustrated in FIG. 1, one of ordinary skill in the art, having had the benefit of the present disclosure, will recognize that only two lighting fixtures, or more than three lighting fixtures may be provided in some lighting systems. Moreover, alternative connection topologies between the group lighting controller 110 and the lighting fixtures 120A-C may be utilized. In some embodiments one or more lighting fixtures described herein may comprise several independent lighting units. For example, in retail track lighting several physically independent track heads may constitute a single lighting fixture (e.g., a single lighting controller may control the several track heads). Also, for example, in office lighting two or four directly adjacent lighting units may constitute a single lighting fixture. Also, for example, if light sources are embedded within building materials (e.g., concrete, ceiling foam, walls), the lighting fixture may include a local area of light sources that are controlled in a consistent manner.

Figure 3:
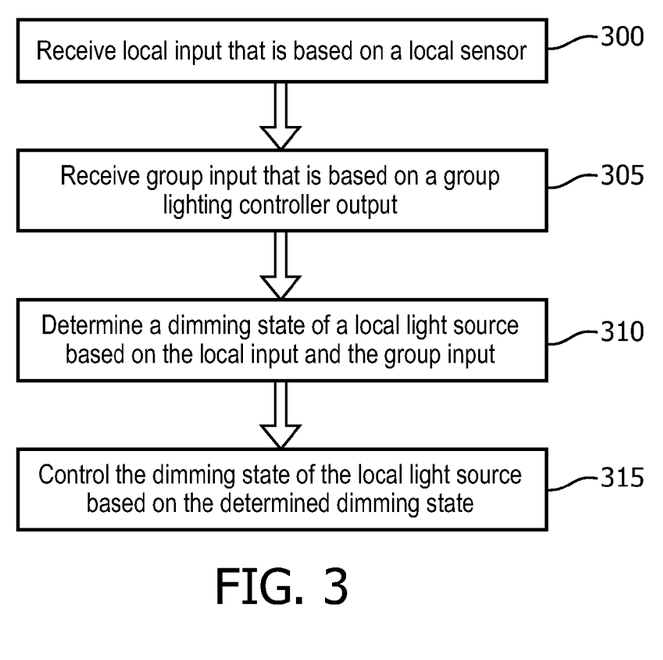
FIG. 3 illustrates a flow chart of adjusting lighting at a lighting fixture based on a local input and a global input.

Referring to FIG. 3, a flow chart of adjusting lighting at a lighting fixture based on a local input and a global input is provided. Other implementations may perform the steps in a different order, omit certain steps, and/or perform different and/or additional steps than those illustrated in FIG. 3. For convenience, aspects of FIG. 3 will be described with reference to one or more components of a lighting system that may perform the method. The components may include, for example, one or more of the components of lighting fixtures 120A and 120B of FIG. 1, such as lighting controller 130A and driver power stage 150A of lighting fixture 120A (illustrated in FIG. 2) and/or similar components of lighting fixture 120B. Accordingly, for convenience, aspects of FIGS. 1 and 2 will be described in conjunction with FIG. 3.

At step 300 local input is received that is based on a local sensor. For example, local input may be received by lighting controller 130A via local input 134A. The local input may be based on input received from first sensor 125A via first local connection 133A. For example, in some embodiments the first local connection 133A may be coupled directly to the local input 134A. In some embodiments the local sensor may be a daylight sensor and the local input may be indicative of a lighting level sensed by the daylight sensor. In some embodiments the local sensor may be an occupancy sensor and the local input may be indicative of whether occupancy is detected by the occupancy sensor. In some embodiments the local sensor may be an environmental sensor such as an acoustic sensor, an electronic nose/smell sensor, a smoke sensor, and/or a $CO_2$ sensor. In some embodiments the local sensor may be an apparatus that provides installation context information to a controller of a lighting fixture. For example, the installation context information may provide an indication of the prevalent task performed in an area illuminated by the lighting fixture such as computer aided drafting work, reading paper documents, and/or reading by elderly workers (which may require a higher light output due to weaker eyes). The installation context information may be preprogrammed or preconfigured in the local sensor and/or may be received via one or more network interfaces. For example, in some embodiments the local sensor may include a network interface (e.g., Bluetooth, Wi-Fi) to enable personalized control of installation context information via one or more computing devices such as a mobile computing device (e.g., smart phone, tablet) utilizing, for example, a local control user interface such as a local control user interface described herein.

At step 305 group input is received that is based on a group lighting controller output. For example, group input may be received by lighting controller 130A via group input 132A. In some embodiments the group input may be based on group lighting controller output provided by group lighting controller 110 over wiring 115 to first group connection 131A. For example, in some embodiments the first group connection 131A may be coupled directly to the group input 132A. In some embodiments the group lighting controller output may be based on input from a group sensor. In some embodiments the group sensor may be a group occupancy sensor sensing occupancy at one or more locations such as an entrance to an area containing one or more lighting fixtures to which the group lighting controller output is provided. In some embodiments the group sensor may be a group daylight sensor sensing lighting levels at one or more locations such as near a window in an area containing one or more lighting fixtures to which the group lighting controller output is provided. In some embodiments the group lighting controller output may be based on input from other sources such as a timer and/or a load-shedding request (e.g., from a utility company or other source).

At step 310 a dimming state of a local light source is determined based on the local input and the group input. For example, the lighting controller 130A may utilize the local input 134A and the group input 132A to determine an appropriate dimming state of LEDs 150A. For example, when the group input is indicative of a dimming command, the dimming command may be compared to the local input to determine the parameters for implementing the dimming command. For example, if the group input is indicative of a dimming command and the local sensor is a daylight sensor, the local input may be compared to the dimming command to determine to what extent the light output of a local light source needs to be adjusted to effectuate the desired result of the dimming command. For example, the local input may be consulted to determine the current light level relative to a desired light level corresponding to the dimming level indicated by the group input, and the adjustment of the light output of a local light source determined based on the current light level. For example, the group input may indicate that the light source should operate at a 75% light output level. A controller may determine that a 75% desired light level for the lighting fixture, corresponding to a 75% light output level, is 400 lux. The local input may indicate that the current light level is 500 lux as a result of daylight, other light sources, and/or the current light output of the local light source. Based on the indicated current light level, the light output level of the light source may be determined in order to achieve the 75% desired light level of 400 lux. In some embodiments the determined light output level of the light source to achieve the 75% desired light level of 400 lux may be less than 75% of the light output level due to, for example, daylight contributions.

Also, for example, the group input may indicate that the light source should operate at a 75% light output level and the light output level of the light source may be initially adjusted to a 75% light output level. A controller may determine that a 75% desired light level for the lighting fixture is 400 lux. The local input may indicate that the light level present when the light source is adjusted to a 75% light output level is 500 lux as a result of daylight and/or other light sources. Based on the indicated light level, the light output level of the light source may be reduced until the 75% desired light level of 400 lux is achieved as determined via the local input.

Also, for example, if the group input is indicative of a dimming command and the local sensor is an occupancy sensor, the local input may be consulted to determine when the dimming command needs to be effectuated. For example, the local input may be consulted to determine when a user is near the lighting fixture and only implement the dimming command indicated by the group input when it is determined that a user is near the lighting fixture and/or has been near the lighting fixture within a threshold period of time. For example, the group input may indicate that the light source should operate at a 100% light output level. A controller may determine via local input that at a first time no user is near the lighting fixture and/or no user has been near the lighting fixture within a threshold time period. Based on such a determination the light output level of the local light source may be turned off or operated at a reduced level (e.g., 50%) at the first time. The controller may further determine via local input that at a second time a user is near the lighting fixture and, based on such a determination, the light output level of the local light source may be operated at the 100% light output level requested by the group input at the second time and for a determined amount of time thereafter.

In some embodiments, determining a dimming state of a local light source based on the local input and the group input may comprise determining the lower level dimming state between the dimming state indicated by the group input and the dimming state indicated by the local input. For example, if the group input indicates a 75% dimming state is desired and the local input indicates a 50% dimming state is desired, the 50% dimming state will be determined.

One of ordinary skill in the art, having had the benefit of the present disclosure, will recognize and appreciate that additional and/or alternative methods for determining a dimming state of a local light source based on the local input and the group input may be implemented. For example, the dimming state may be determined based on averaging the appropriate dimming state of the light source as indicated by the group input and the appropriate dimming state of the light source as indicated by the local input. For example, if the group input indicates a light output level of 75% and the local input indicates that a light output level of 50% is sufficient, the light output level of the light source may be determined to be 62.5%. In some implementations any average may be a weighted average (e.g., more heavily weighting either the group input or the local input).

At step 315, the dimming state of a local light source is controlled based on the determined dimming state. For example, the lighting controller 130A may provide control commands to the driver power stage 140A to enable the driver power stage 140A to drive the LEDs 150A at the dimming state determined at step 310.

Figure 4:
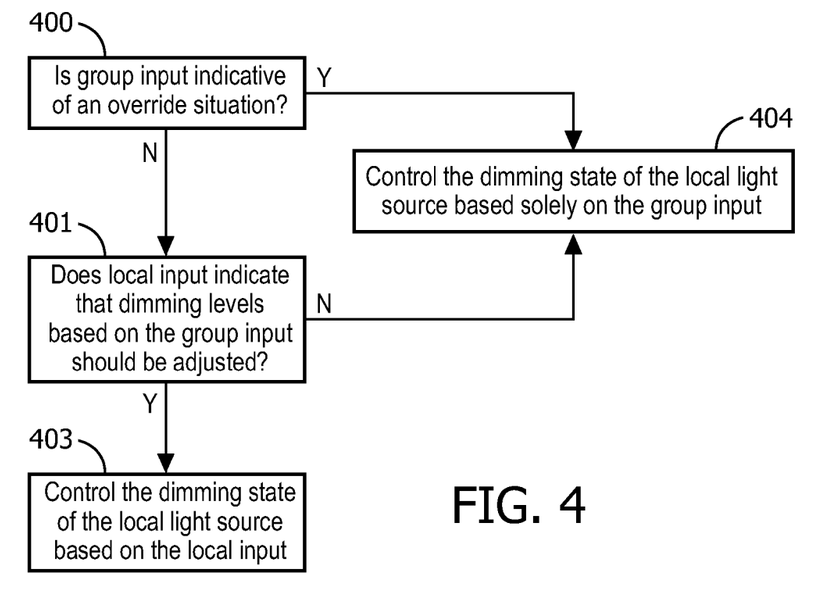
FIG. 4 illustrates a flow chart of an example method of determining whether to control the dimming state of a local light source based on the local input and/or the group input.

FIG. 4 illustrates a flow chart of an example method of determining whether to control the dimming state of a local light source based on the local input or based solely on the group input. Other implementations may perform the steps in a different order, omit certain steps, and/or perform different and/or additional steps than those illustrated in FIG. 4. For convenience, aspects of FIG. 4 will be described with reference to one or more components of a lighting system that may perform the method. The components may include, for example, one or more of the components of lighting fixtures 120A and 120B of FIG. 1, such as lighting controller 130A and driver power stage 150A of lighting fixture 120A (illustrated in FIGS. 2) and/or similar components of lighting fixture 120B. Accordingly, for convenience, aspects of FIGS. 1 and 2 will be described in conjunction with FIG. 4.

At step 400, it is determined if the group input is indicative of an override situation. An override situation may be a situation in which it is desired that only the group input be utilized in determining an appropriate dimming state. Override situations may include, for example, emergency situations, cleaning situations, maintenance situations, calibration situations, or other situations. An override situation may be indicated via the group lighting controller output. For example, the group lighting controller output may include data that indicates an override situation and the lighting controller 130A may determine such override situation based on group input 132A. For example, when the group lighting controller output includes phase-cutting of a power wave-form, one or more phase-cutting sequences may be indicative of an override situation. If the group input is indicative of an override situation, then the dimming state of the local light source is determined based solely on the group input at step 404. For example, the group input may include data indicative of an override situation, then indicate that the light output level of all light sources should be operated at a 100% light output level. The dimming state of the local light source may then be set to 100% light output level at step 404. In some embodiments an override situation may be triggered if the lighting controller 130A receives no group input 132A. For example, the lighting controller 130A may enter a standalone mode (e.g., operate according to predetermined local configuration) and/or automatically provide full light output in the override situation.

If the group input is not indicative of an override situation, then at step 401 it is determined if the local input indicates that dimming levels based on the group input should be adjusted. For example, if the group input indicates that a 100% light output level should be implemented, but local input indicates that a significant amount of daylight is present near the light source, then it may be determined that the dimming level based on the group input should be downwardly adjusted to prevent over-lighting. Also, for example, if the group input indicates that a 100% light output level should be implemented, but local input indicates that users are not currently present near the light source and have not been present near the light source for at least a threshold period of time, then it may be determined that the dimming level based on the group input should be downwardly adjusted to prevent over-lighting. Also, for example, if the group input indicates that a 100% light output level should be implemented, and local input indicates that no daylight or other light source is contributing lighting near the light source, then it may be determined that the dimming level based on the group input does not need to be adjusted. Also, for example, if the group input indicates that a 100% light output level should be implemented, and local input indicates that users are currently present near the light source, then it may be determined that the dimming level based on the group input does not need to be adjusted. If the local input does not indicate that the dimming levels based on the group input should be adjusted, then the dimming state of the local light source is determined based solely on the group input at step 404. If the local input does indicate that the dimming levels based on the group input should be adjusted, then the dimming state of the local light source is determined based on the local input at step 403.

In some embodiments, one or more lighting fixtures may be configured to ignore the group input in one or more situations and control the dimming state of the local light source based solely on the local input during those situations. For example, architectural lighting fixtures, such as architectural lighting fixtures utilized for wall-washing applications, may be configured to ignore the group input in all situations and control the dimming state based solely on the local input. For example, an architectural lighting fixture may have a local sensor that provides installation context information indicating the lighting fixture should remain at a given light output (e.g., full light output) regardless of the dimming level indicated by a group input. Also, for example, an architectural lighting fixture may have a local sensor that provides installation context information indicating the lighting fixture should remain at a given light output (e.g., 80% light output) at all dimming levels indicated by a group input, unless the dimming level indicates an override situation (e.g., in an override situation the light output may be increased to 100% light output). Also, for example, an architectural lighting fixture may have a local sensor that includes a daylight sensor and provides installation context information indicating the lighting fixture should increase light output in response to increased light output sensed via the daylight sensor and that the lighting fixture should utilize whichever of the local input and the group input indicates a higher level of light output. Thus, when the local input is indicative of a dimming level that produces more light output than a dimming level indicated by the group input, the local input may be utilized.

Figure 5:
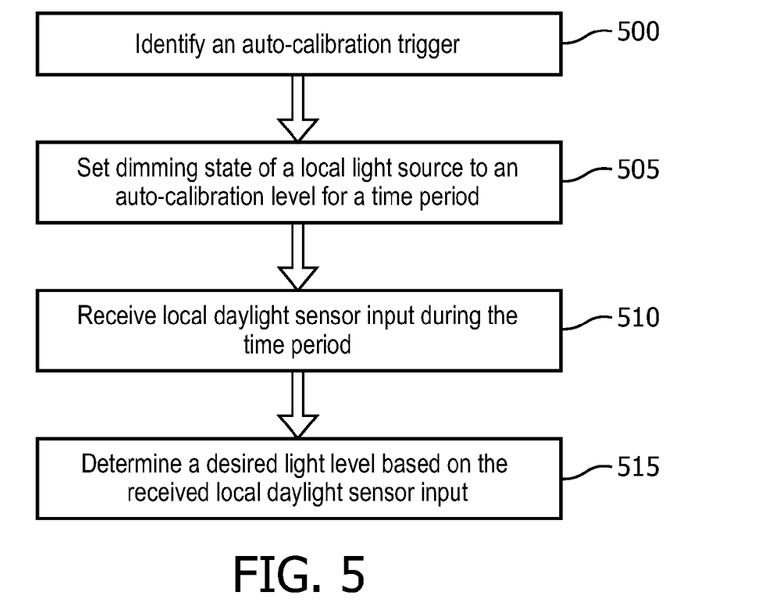
FIG. 5 illustrates a flow chart of an example method of auto-calibrating a lighting fixture to determine a desired light level for the lighting fixture.

FIG. 5 illustrates a flow chart of an example method of auto-calibrating a lighting fixture to determine a desired light level for the lighting fixture. Other implementations may perform the steps in a different order, omit certain steps, and/or perform different and/or additional steps than those illustrated in FIG. 5. For convenience, aspects of FIG. 5 will be described with reference to one or more components of a lighting system that may perform the method. The components may include, for example, one or more of the components of lighting fixtures 120A and 120B of FIG. 1, such as lighting controller 130A of lighting fixture 120A (illustrated in FIG. 2) and/or similar components of lighting fixture 120B. Accordingly, for convenience, aspects of FIGS. 1 and 2 will be described in conjunction with FIG. 5.

At step 500 an auto-calibration trigger is identified. In some embodiments the auto-calibration trigger may include connection of a daylight sensor to a lighting fixture. For example, the auto-calibration trigger for the first lighting fixture 120A may be the connection of the first sensor 125A when the first sensor 125A is a daylight sensor. In some embodiments the lighting controller 130A recognizes connection of the first sensor 125A and enters an auto-calibration state in response. In some embodiments the first sensor 125A sends commands to the lighting controller 130A to place the controller 130A into an auto-calibration state. In some embodiments the auto-calibration trigger may be user interaction with a user interface element such as a reset button or auto-calibration button coupled to the lighting controller 130A. In some embodiments the auto-calibration trigger may be an auto-calibration command sent via the group lighting controller output and received at the lighting fixture. Additional and/or alternative auto-calibration triggers may be utilized.

At step 505 the dimming state of a local light source is set to an auto-calibration level for a time period. For example, the dimming state of the LEDs 150A may be set to a 100% light output level for a twenty-four hour time period. Also, for example, the dimming state of the LEDs 150A may be set to a 100% light output level for one or more times during which it is unlikely that daylight will be present (e.g., midnight). During the time-period the dimming state of the local light source may be maintained, optionally disregarding any dimming commands via the group lighting controller output.

At step 510, local daylight input is received from a local daylight sensor during the time period. For example, the lighting controller 130A may receive daylight sensor data from the first sensor 125A when the first sensor 125A is a daylight sensor. For example, when the time period is a twenty-four hour time period, local daylight input may be received at certain intervals during the twenty-four hour time period (e.g., every 10 minutes). Also, for example, when the time period is one or more times during which it is unlikely that daylight will be present, sensor data may be received during one or more portions of such time periods.

At step 515, a desired light level is determined based on the local daylight sensor input received at step 510. For example, when the time period is a twenty-four hour time period, the desired light level may be based on the minimum light level indicated by the local daylight input received at step 510, optionally accounting for outliers. This assumes that at the minimum recorded light level, no daylight contribution to the light level is present. Also, for example, when the time period is a twenty-four hour time period, the desired light level may be based on an average of the X lowest light levels indicated by the local daylight input received at step 510, optionally accounting for outliers. Also, for example, when the time period is one or more times during which it is unlikely that daylight will be present, the desired light level may be based on one or more of the light levels indicated by the local daylight input received at step 510, optionally accounting for outliers. For example, the desired light level may be based on an average of X light levels received during the times during which it is unlikely that daylight will be present.

In some embodiments, in determining a desired light level, knowledge of the present maximum light level of the lighting fixture may be utilized. For example, the present maximum light level of the lighting fixture may be utilized to ignore one or more local daylight sensor inputs received at step 510 in determining a desired light level. For example, despite signals from the daylight sensor indicating a desire for 100% light output, the lighting fixture may provide less than 100% light output at one or more times due, for example, to received group dimming commands that dictate a less than 100% light output level. Sensor inputs received during such one or more times may optionally be ignored and/or adjusted in determining a desired light level.

In some embodiments, one or more steps of FIG. 5 may be performed by the local daylight sensor itself, without involvement of a separate lighting controller. For example, if the local input 134A of lighting controller 130A is a single directional interface such as an interface receiving 0-10V signals indicative of desired dimming, bi-directional information exchange regarding the present dimming level between the daylight sensor and the lighting controller may be prohibited. In such a situation, the daylight sensor might wrongly assume that the lighting fixture is at full light output (e.g., 500 lux), when the daylight sensor requests full light output from a lighting controller (e.g., by providing a 10V signal). In reality, however, the actual light output of the lighting fixture may be less than full light output (e.g., 300 lux) due, for example, to a dimming request received via a group input of the lighting fixture. Accordingly, in some embodiments the daylight sensor may determine the maximum light level presently allowed by the group input. The maximum light level presently allowed by the group input may be determined by the daylight sensor via gradually increasing the light output level requested by the daylight sensor (e.g., gradually increasing the 0-10V signal provided by the daylight sensor to the local input of the lighting fixture) and sensing the light output level during the gradual increasing of the requested light output level. When it is determined that the light output level sensed by the daylight sensor stops increasing in response to requested increases in the light output level by the daylight sensor, the daylight sensor may utilize such occurrence to determine the maximum light level allowed by the group input. As an example, assume the daylight sensor provides 0-10V signals indicative of desired dimming levels, with 0V being indicative of the greatest degree of dimming (least amount of light output) and 10V being indicative of the smallest degree of dimming (greatest amount of light output). The daylight sensor may gradually increase the signal from 0V and monitor the light output until it detects the light output is no longer changing. For example, the daylight sensor may detect a stall in the changing of the light output at a signal of 5V. Based on such determination, the maximum light output level allowed by the group input may be determined. For example, it may be determined that the group light output level is at 50% light output level, thereby explaining the failure of the lighting fixture to increase the light output level beyond a provided signal of 5V. In some embodiments the present maximum light level of the lighting fixture may be utilized to ignore one or more local daylight sensor inputs received at step 510 in determining a desired light level.

In some embodiments, additional inputs may be utilized to determine a desired light level. For example, the targeted task-area lux-level of the lighting fixture design may be indicated via late stage configuration of the lighting fixture and utilized in determining a desired light level.

The desired light level is generally indicative of an intended level of light that should collectively be provided to the area illuminated by a lighting fixture via the light source of the lighting fixture and daylight and/or other light sources, at a given light output level of the lighting fixture. For example, when the auto-calibration level of the light source at step 505 is 100%, the desired light level determined at step 515 may indicate the intended level of light that should be provided by the light source when it is at a 100% light output level and no other light contributions are present. The desired light level may be utilized as a reference point to adjust the light output level of the light source as described herein to prevent over-lighting by the light source. For example, if a desired light level of the light source when it is at 100% light output is 500 lux, and a daylight sensor reading indicates that a light level of 600 lux is present when the light source is at 100% light output (e.g., due to daylight), the light output of the light source may be reduced below 100% light output, while still maintaining the desired light level. In some implementations desired light levels corresponding to less than 100% light output of a light source may be determined. For example, steps 500-515 may be performed with an auto-calibration level at less than 100% light output. Also, for example, the desired light level at 100% light output may be utilized to determine light levels at less than 100% light output. For example, the desired light level at 50% light output may be determined to be 50% of the desired light level at 100% light output. Any determined desired light level may be stored in memory associated with a lighting controller such as lighting controller 130A and may optionally be utilized in one or more methods and/or apparatus described herein.

Figure 6:
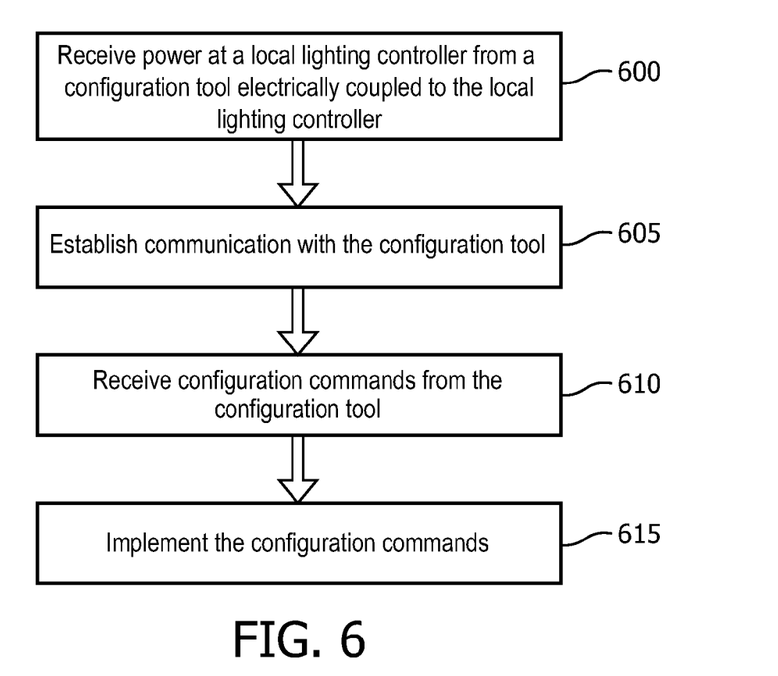
FIG. 6 illustrates a flow chart of an example method of utilizing a configuration tool to implement configuration commands.

FIG. 6 illustrates a flow chart of an example method of utilizing a configuration tool to implement configuration commands. Other implementations may perform the steps in a different order, omit certain steps, and/or perform different and/or additional steps than those illustrated in FIG. 6. For convenience, aspects of FIG. 6 will be described with reference to one or more components of a lighting system that may perform the method. The components may include, for example, one or more of the components of lighting fixtures 120A and 120B of FIG. 1, such as lighting controller 130A and driver power stage 150A of lighting fixture 120A (illustrated in FIG. 2) and/or similar components of lighting fixture 120B. Accordingly, for convenience, aspects of FIGS. 1 and 2 will be described in conjunction with FIG. 6.

At step 600, power is received at a local lighting controller from a configuration tool electrically coupled to the local lighting controller. For example, a configuration tool having a power source may be coupled to the lighting controller 130A and may supply power to the lighting controller 130A to implement configuration commands associated with the lighting controller 130A. This may enable configuration of the lighting controller 130A without necessitating the lighting controller 130A be powered via mains power. In some embodiments the configuration tool may be coupled to the local input 134A (without the first sensor 125A also being coupled thereto) and/or the group input 132A (without the wiring 115 coupled thereto). In some embodiments the configuration tool may be a mobile computing device such as, for example, a mobile phone (e.g., a smart phone), a tablet computing device, and/or a wearable computing device (e.g., a wearable watch computing device). A dongle may be utilized that enables wired connection to the mobile computing device (e.g., micro USB) and enables connection to the lighting controller 130A (e.g., via an interface similar to an interface utilized by first sensor 125A).

At step 605, communication with the configuration tool is established. For example, the lighting controller 120A may establish a connection with the configuration tool. In some embodiments a connection may be established in response to a user action with the configuration tool. In some embodiments authentication may be required to establish connection between the configuration tool and the lighting controller. For example, only certain configuration tools may be identified as authenticated to establish connection with the lighting controller. Also, for example, a user may be required to provide authentication information such as a username and/or password. Additional and/or alternative forms of user and/or mobile computing device authentication may be utilized.

At step 610, configuration commands are received from the configuration tool. For example, configuration commands may include indication of desired light levels for the lighting fixture in which the lighting controller is implemented. For example, a readable code such as a bar code and/or QR label attached to the lighting fixture and/or packaging of the lighting fixture may be indicative of a desired light level of the lighting fixture. A camera of the configuration tool may be utilized to read the QR label and determine the desired light level of the lighting fixture based on the QR label. The configuration tool may utilize the determined desired light level to provide configuration commands to the lighting controller to set the desired light level. Additional and/or alternative configuration commands may be received from the configuration tool. For example, a lighting fixture profile may be set via the configuration tool, max-power capping of the lighting fixture may be set via the configuration tool, firmware of the lighting controller may be updated via the configuration tool, and/or override of one or more features may be accomplished via the configuration tool. For example, the configuration tool may be used to disable occupancy sensing features for lighting fixtures located close to a frequently utilized walkway to prevent annoying frequent switching on/off of the lighting fixture. Also, for example, daylight sensing might be disabled for one or more lighting fixtures in areas where accurate daylight sensing is not possible (e.g., a large class table changing greatly in reflectivity depending on the amount of paper lying on the table).

In some embodiments, data provided by the lighting controller 120A to the mobile configuration tool may be utilized by the configuration tool to initiate a configuration application on the configuration tool. For example, the lighting controller 120A may send configuration application program data that itself may include code to be executed by the configuration tool to execute the configuration application on the configuration tool. Also, for example, the lighting controller 120A may send configuration application location data that may be utilized by the configuration tool to execute the configuration application on the configuration tool and/or access the configuration application via the configuration tool. For example, an Internet address may be provided from which configuration application code may be received and executed on the configuration tool. Also, for example, an Internet address may be provided that the configuration tool may utilize to access the configuration application. For example, the configuration application may execute on a remote computing device and the configuration tool may access the configuration application via a web browser of the configuration tool to enable use of the configuration application. In some embodiments, in order for the configuration tool to gain access to the lighting controller 130A, a security feature may include that only configuration tools with access to a local secure Wi-Fi network are allowed (e.g., by requiring that the communication with the configuration tool occur via the local secure Wi-Fi network).

At step 615, the configuration commands received at step 610 are implemented. For example, configuration commands may be utilized to update firmware of lighting controller 130A and/or may be stored in memory by the lighting controller 130A. For example, when the control commands include indication of a desired light level, the desired light level may be stored in memory by the lighting controller as described herein.

In some embodiments, when a lighting fixture includes a sensor that is a daylight sensor, the daylight sensor may optionally be utilized to provide configuration commands to the lighting controller. For example, a laser or other lighting device may be utilized to apply a high-brightness level of light output directly to the daylight sensor. The daylight sensor and/or the lighting controller may recognize such high-brightness condition as a configuration command input. For example, a laser from a laser pointer may be pointed at the daylight sensor and a lighting controller receiving sensor values from the lighting sensor may recognize this high-brightness level of configuration input indicating that light output adjustments based on local input should be overridden (e.g., just when the laser is actively on the daylight sensor, for a determined time period, and/or until the laser is removed from the daylight sensor and placed back on the daylight sensor). Also, for example, a laser from a laser pointer may be pointed at the daylight sensor to toggle between defined intelligent lighting fixture profiles (e.g., corridor mode, window mode, emergency exit mode, cleaning mode). For example, each time the laser is applied and removed from the daylight sensor the lighting controller will determine corresponding input received from the daylight sensor is indicative of a desire to toggle to a new lighting fixture profile. Also, for example, a laser from a laser pointer may be pointed at the daylight sensor to set a desired maximum light output level. For example, when the laser is applied the lighting controller will gradually cause the light output level of the light source controlled thereby to be adjusted. The user may remove the laser when the desired light output level is achieved and the desired light output level may be utilized as the maximum light output level. A user may utilize a light sensor while setting the maximum light output level of the lighting fixture to ensure the maximum light output level does not exceed a maximum desired light output level, such as a regulatory lux limit.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims between parentheses are provided merely for convenience in line with European patent practice and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A lighting fixture, comprising:
    a light source;
    a first input electrically connectable to a first sensor providing first sensor values, the first sensor being one of:
        a daylight sensor wherein the first sensor values are indicative of light levels near the lighting fixture,
        an occupancy sensor wherein the first status values are indicative of occupancy status near the lighting fixture, and
        an environmental sensor wherein the first status values are indicative of environmental conditions near the lighting fixture;
    a second input electrically connectable to a group lighting controller output;
    a memory;
    a lighting controller controlling the dimming state of the light source; the lighting controller operable to execute instructions, stored in the memory, including instructions to perform the operations of:
        receiving local input via the first input, the local input indicative of the sensor values;
        receiving group input via the second input, the group input indicative of the group lighting controller output, wherein the group lighting controller output utilizes phase cutting to indicate a dimming level to control the dimming state of the lighting fixture and at least one additional lighting fixture; and
        determining the dimming state of the light source based on the group input and the local input.

2. The lighting fixture of claim 1, wherein the lighting fixture includes the daylight sensor and wherein the group lighting controller output is responsive to a group occupancy sensor.

3. The lighting fixture of claim 1, wherein the lighting fixture includes the occupancy sensor and wherein the group lighting controller output is responsive to a group daylight sensor.

4. The lighting fixture of claim 1, wherein the local input consists of the sensor values.

5. The lighting fixture of claim 1, wherein the memory includes an expected lux level for the lighting fixture.

6. The lighting fixture of claim 5, wherein the lighting controller utilizes the expected lux level in auto-calibration of the lighting fixture.

7. The lighting fixture of claim 5, wherein the expected lux level is adjustable via late stage configuration of the lighting controller.

8. The lighting fixture of claim 1, wherein the lighting controller controls the dimming state of the light source based on the local input when the local input is indicative of a dimming level that produces less light from the light source than the dimming level indicated by the group input.

9. The lighting fixture of claim 1, wherein the lighting controller controls the dimming state of the light source based on the local input when the local input is indicative of a dimming level that produces more light from the light source than the dimming level indicated by the group input.

10. The lighting fixture of claim 9, wherein the lighting fixture is an architectural lighting fixture.

11. The lighting fixture of claim 1, wherein the lighting fixture includes the daylight sensor and is operable in an auto-calibration state, wherein the lighting controller maintains the dimming state of the light source at an auto-calibration level and determines a desired light level near the lighting fixture during the auto-calibration state, and wherein the desired light level is utilized in the determination of the dimming state of the lighting fixture.

12. The lighting fixture of claim 11, wherein during the auto-calibration state, the lighting controller determines a minimum local input value from the local input over a time period and determines the desired light level based on the minimum local input value, the minimum local input value indicative of a minimum light level indicated by the sensor values.

13. The lighting fixture of claim 12, wherein said time period is at least twelve hours.

14. The lighting fixture of claim 12, wherein said time period is at least twenty-four hours.

15. The lighting fixture of claim 11, wherein during the auto-calibration state, the lighting controller determines a first local input value from the local input at one or more times likely to have no natural light and determines the desired light level based on the first local input value.

16. The lighting fixture of claim 11, wherein said auto-calibration level is a full light output level.

17. The lighting fixture of claim 11, wherein said auto-calibration level is a reduced light output level.

18. The lighting fixture of claim 17, wherein the lighting controller determines the reduced light output level and provides the reduced light output level to the daylight sensor.

19. The lighting fixture of claim 17, wherein the lighting sensor autonomously determines the reduced light output level.

20. The lighting fixture of claim 1, wherein the group input is provided over mains wiring supplying power to the lighting fixture.

21. A lighting system comprising:
a first lighting fixture having a dimmable first light source;
a first controller in electrical communication with said first light source, wherein said first controller:
- receives first local input, the first local input indicative of one of light levels near the first lighting fixture, occupancy status near the first lighting fixture, and environmental conditions near the first lighting fixture,
- receives group input indicating a dimming level, and
- determines the dimming state of a first light source of the first lighting fixture based on the group input and the first local input;

a second lighting fixture having a dimmable second light source; and
a second controller in electrical communication with said second light source, wherein said second controller:
- receives second local input, the second local input indicative of one of light levels near the second lighting fixture, occupancy status near the second lighting fixture, and environmental conditions near the second lighting fixture,
- receives the group input at the second lighting fixture, and
- determines the dimming state of a second light source of the second lighting fixture based on the group input and the second local input.

* * * * *